United States Patent [19]

Shelangoskie et al.

[11] Patent Number: 4,771,549

[45] Date of Patent: Sep. 20, 1988

[54] METHOD AND APPARATUS FOR MEASURING DEVIATIONS FROM FLATNESS

[75] Inventors: Donald R. Shelangoskie, Richmond Heights; Arthur A. Huckelbridge, Jr., Cleveland Heights; Dario A. Gasparini, Shaker Heights; James T. Wright, Cleveland; Barry A. Rogers; Stephen Marine, both of South Euclid, all of Ohio

[73] Assignee: The Austin Company, Cleveland, Ohio

[21] Appl. No.: 25,886

[22] Filed: Mar. 16, 1987

[51] Int. Cl.⁴ ............................................... G01B 7/28
[52] U.S. Cl. ..................................... 33/533; 33/504; 33/1 BB; 73/146
[58] Field of Search ................. 33/502, 504, 505, 521, 33/523, 526, 533, 1 BB; 73/146

[56] References Cited

U.S. PATENT DOCUMENTS

| | | | |
|---|---|---|---|
| 1,666,563 | 4/1928 | Hagen | 33/174 |
| 2,667,698 | 2/1954 | Bryan, Jr. | 33/141.5 |
| 2,784,496 | 3/1957 | Rousse | 33/174 |
| 3,151,235 | 11/1964 | Greenshields | 235/92 |
| 3,357,238 | 12/1967 | Musante et al. | 33/533 |
| 3,797,124 | 3/1974 | Easterling et al. | 33/331 |
| 4,048,324 | 4/1978 | Whitehouse | 33/504 |
| 4,100,795 | 7/1978 | Panetti | 73/146 |
| 4,135,304 | 1/1979 | Kuntz | 33/521 |
| 4,137,638 | 2/1979 | Watts | 33/523 |
| 4,434,558 | 3/1984 | Face, Jr. et al. | 33/174 P |
| 4,471,530 | 9/1984 | Kirven | 33/505 |
| 4,473,960 | 10/1984 | Face, Jr. et al. | 33/366 |
| 4,586,138 | 4/1986 | Mullenhoff et al. | 73/146 |
| 4,689,892 | 9/1987 | Kirven | 33/533 |
| 4,697,352 | 10/1987 | Angove | 33/523 |

FOREIGN PATENT DOCUMENTS 1590017  5/1981  United Kingdom.

Primary Examiner—William D. Martin, Jr.
Attorney, Agent, or Firm—Marshall, O'Toole, Gerstein, Murray & Bicknell

[57] ABSTRACT

Deviations in flatness on a horizontal surface are measured by running over the surface, at a constant driven speed, an instrument sensitive to slope and which generates a continuous voltage signal corresponding to a continuous slope measurement. The continuous voltage signal is filtered to remove extraneous high frequency voltage signals thereby to produce raw continuous analog slope data which is digitized and calibrated to provide calibrated digital slope data from which other flatness data is computed. Procedures are described for calibrating the instrument and for eliminating or compensating for distortions in the measurements.

36 Claims, 3 Drawing Sheets

METHOD AND APPARATUS FOR MEASURING DEVIATIONS FROM FLATNESS

BACKGROUND OF THE INVENTION

The present invention relates generally to methods and apparatus for measuring deviations from flatness on a horizontal surface, and more particularly to methods and apparatus for doing so with improved speed and accuracy.

There are a number of instances where the flatness of a horizontal surface is a matter of critical importance. Examples of such instances include floors in warehouses having high storage racks. In warehouses of this type, goods are moved to and from the storage racks by fork-lift trucks having lifting forks mounted for vertical movement on vertical frames extending as high as 40 feet above the floor, for example. As these trucks move across the floor, deviations in floor flatness are manifest by vibrations or oscillations in the vertical frame, and the amplitude of these oscillations increases with the height of the frame. These oscillations are undesirable, and accordingly, flatness tolerances on the floors in such warehouses are extremely strict. If the flatness deviations are outside these tolerances, the floor must be refinished to bring flatness within the tolerances.

Flatness deviations comprise bumps and recesses, and these are defined by (a) slope (i.e. the angle from the horizontal), (b) vertical displacement from a given reference level and (c) curvature (change of slope). In order to determine whether floor flatness is within tolerance, it is necessary to measure the flatness of the entire floor, and this requires a multiplicity of flatness measurements at relatively closely spaced intervals in two mutually perpendicular directions and encompassing the entire area of the floor. There are a number of types of measuring devices previously employed for this purpose, but they all have drawbacks of one type or another.

There are manual systems for measuring flatness deviations, and these usually employ a traditional engineer's optical level and rod or a level straight edge with a sliding dial gage mounted at right angles to the straight edge. Measurements obtained from these manual systems are then graphically plotted on a grid of the floor. These systems are tedious, labor intensive and often require skilled personnel. Another drawback is that the time constraints associated with these manual systems limit the number of actual measurements to a relatively small number of points on the floor, and this requires interpolation from the actual measurements to reflect flatness deviations between the measurement points. Interpolation does not necessarily provide a true indication of flatness deviations between measurement points. In floors requiring the critical flatness characteristics under discussion here, such interpolations are not acceptable.

Reducing the interval at which the above-described manual measurements are made, to the extent necessary to avoid unacceptable amounts of interpolation, makes the entire measurement job extremely lengthy, tedious and expensive.

Another manual method for measuring flatness deviations employs a device which is moved across the floor along a line on a step by step basis. At each step an instrument mounted on the device gives a reading of slope or displacement. This procedure is repeated along a multiplicity of spaced lines on the floor, and the readings at each step on each line are recorded and plotted. This procedure too is tedious and time consuming.

Other flatness measurement devices employ wheeled vehicles mounting instruments which measure floor slope as the wheeled vehicle moves across the floor along a predetermined line. This procedure is repeated along a multiplicity of spaced lines. Measurements obtained from the slope sensing device can be recorded and plotted. Although this procedure is less tedious and less labor intensive than the manual procedures described above, there are distortions in the data produced by such a procedure in that the slope measurement produced for a given floor location may not accurately reflect the actual slope at that location, and the curvature and displacement data provided by such a procedure are also not accurate.

SUMMARY OF THE INVENTION

The present invention provides a method and apparatus for automatically measuring flatness as a wheeled vehicle follows a line along a floor or other horizontal surface, and it does so while eliminating or minimizing the distortions inherent in prior art procedures of this type.

The slope measuring instrument utilized in the apparatus is an inclinometer, a conventional, commercially available slope sensing device. The inclinometer is mounted on a trailer or similar vehicle having front and rear wheels. The inclinometer generates a voltage signal which is proportional to the angle of the slope it senses.

The inclinometer is sensitive not only to slope but also to acceleration. The apparatus moves along the floor at a constant driven speed, but when the apparatus is started from a dead stop, it accelerates from zero to the constant driven speed. Accordingly, slope measurement readings are not begun until some time after the start, when the apparatus is traveling at a constant driven speed. Otherwise, voltage signals generated by the inclinometer would be influenced by the acceleration from a dead stop, and the signals would not accurately represent the slope along that portion of the floor at which the device is accelerating.

The slope sensing device (i.e. the inclinometer) is first calibrated and then run at a constant driven speed on the floor surface along an elongated path having a predetermined length and a pair of parallel side edges. As the device is run along the path, measurements are continuously made of the slope of the floor surface in the longitudinal direction of the path, along at least one side edge thereof and preferably along both side edges thereof using an inclinometer along each side edge. Measurements are also made transversely across the path using another inclinometer. A continuous voltage signal is generated for each of the longitudinal and transverse continuous slope measurements. Each of these continuous voltage signals is recorded as continuous raw analog slope data. The analog slope data is then digitized at a pre-selected digitization interval to thereby produce raw digital slope data which is then converted to calibrated digital slope data.

The digitization interval is introduced into the slope data after producing raw analog slope data as a continuous signal. As a result, the digitization interval can be custom selected for each particular job, and there are no constraints in the apparatus itself on the digitization interval. By selecting a digitization interval which is sufficiently small, one can minimize the distortion otherwise resulting from converting continuous analog data to digital form.

As noted above, the inclinometer which measures the slop along the longitudinal direction of the path is located on a trailer having front and rear wheels. In such an arrangement, the voltage signal generated by the inclinometer reflects a slope location which lags the actual slope location by one-half the distance between (a) the axis of the front wheel and (b) the axis of the rear wheel. The present invention employs a procedure, to be subsequently described, for overcoming the distortion resulting from this lag.

The present invention includes other procedures, to be described below, for correcting distortions or errors otherwise introduced into the data by measurement methods of the general type employed herein.

The method and apparatus of the present invention are not limited to measuring the flatness of warehouse floors or the like but also have other uses such as determining the location of beams in floors, determining where a floor has been deformed due to overloading, determining the presence of curling or uplift at certain joints in a floor, and other uses of a forensic nature.

Other features and advantages are inherent in the method and apparatus claimed and disclosed or will become apparent to those skilled in the art from the following detailed description in conjunction with the accompanying diagrammatic drawings.

DETAILED DESCRIPTION

Figures 1, 2, 7:
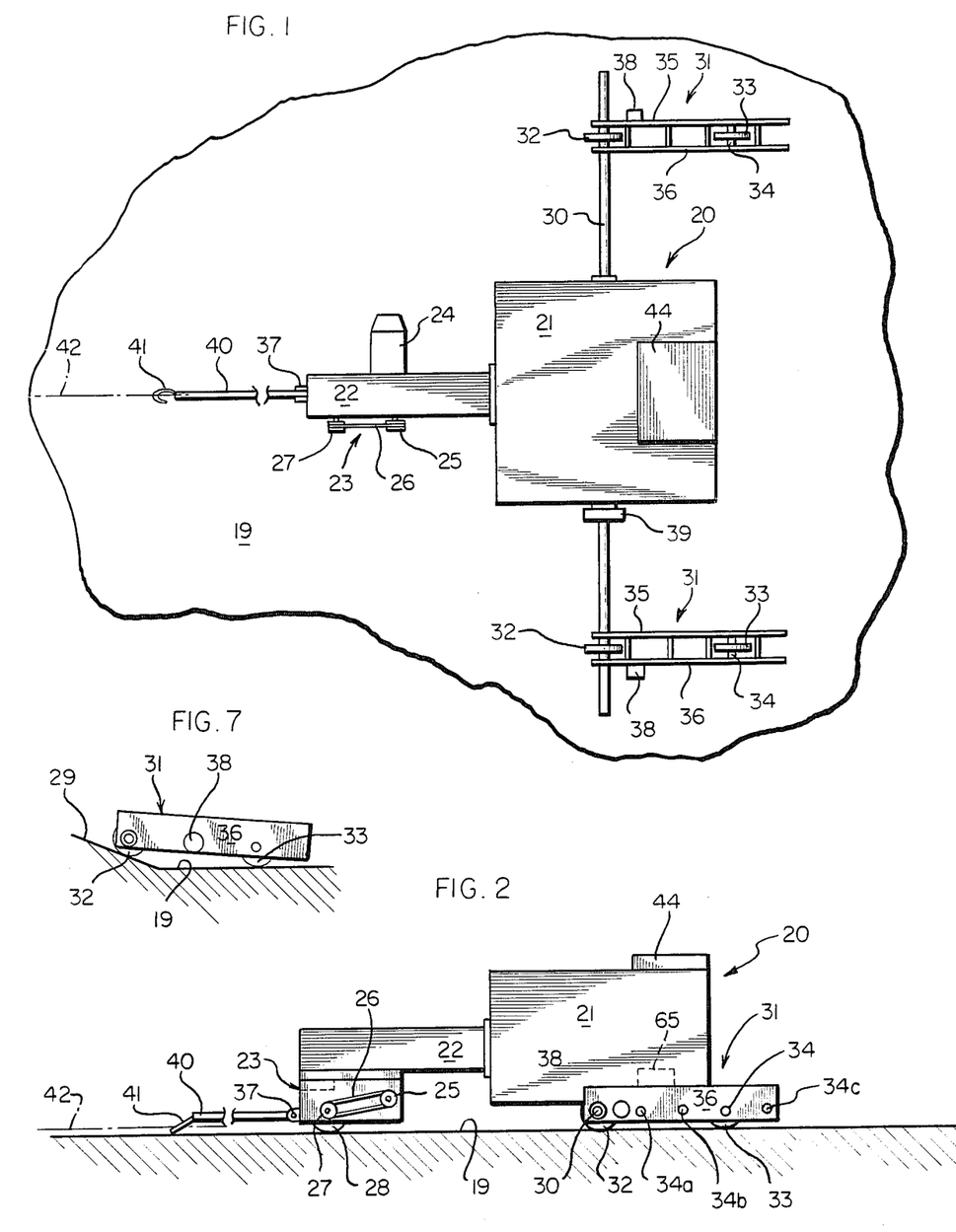
FIG. 1 is a plan view of an embodiment of apparatus constructed in accordance with the present invention.
FIG. 2 is a side elevational view of the apparatus of FIG. 1.
FIG. 7 (on sheet 1) illustrates diagrammatically the distortion phenomenon known as phase lag.

Referring initially to FIGS. 1 and 2, illustrated generally at 20 is an apparatus for measuring deviations from flatness on a horizontal surface, such as a floor surface 19. Apparatus 20 is constructed in accordance with an embodiment of the present invention and comprises a housing 21 containing circuitry and controls for the apparatus. Extending forwardly from housing 21 is a member 22 beneath which is located an apparatus driving mechanism indicated generally at 23. Mechanism 23 comprises a D.C. motor 24 driving a first sprocket 25 in turn driving a chain 26 in turn driving a second sprocket 27 drivingly connected to the axle of a drive wheel 28.

Located beneath housing 21 is a transverse axle 30 at each opposite end portion of which is located a wheeled trailer indicated generally at 31. Each trailer 31 comprises a front wheel 32 mounted on axle 30 and spaced from a rear wheel 33 mounted on an axle 34 extending between a pair of side plates 35, 36. Mounted on the outer side plate of each trailer 31 is an inclinometer 38, and mounted on transverse axle 30 adjacent housing 21 is an inclinometer 39. Inclinometers 38, 39 constitute instruments for measuring slope and are of conventional construction and commercially available. Each inclinometer 38, 39 is sensitive to both slope and acceleration.

Each inclinometer 38 is mounted on trailer 31 between front wheel 32 and rear wheel 33. The location of rear wheel 33 and its axle 34 may be adjusted to vary the distance between axles 30 and 34. Thus rear axle 34 may be adjusted to locations indicated at 34a, 34b or 34c in FIG. 2.

Extending forwardly from drive mechanism 23, and pivotally connected thereto at 37, is a guide arm 40 at the forward end of which is a hook 41 for engaging a guide line 42 composed of string or cord. Guide line 42 defines an elongated path along which apparatus 20 moves for the purpose of measuring the floor flatness. Guide line 42 starts at a location upstream of the location where flatness measurements begin and extends downstream past the location where flatness measurements end, for a distance equal to at least the distance between the rearmost inclinometer and hook 41.

Located atop housing 21 is an analog recorder 44 of conventional construction.

Figures 3, 5, 6:
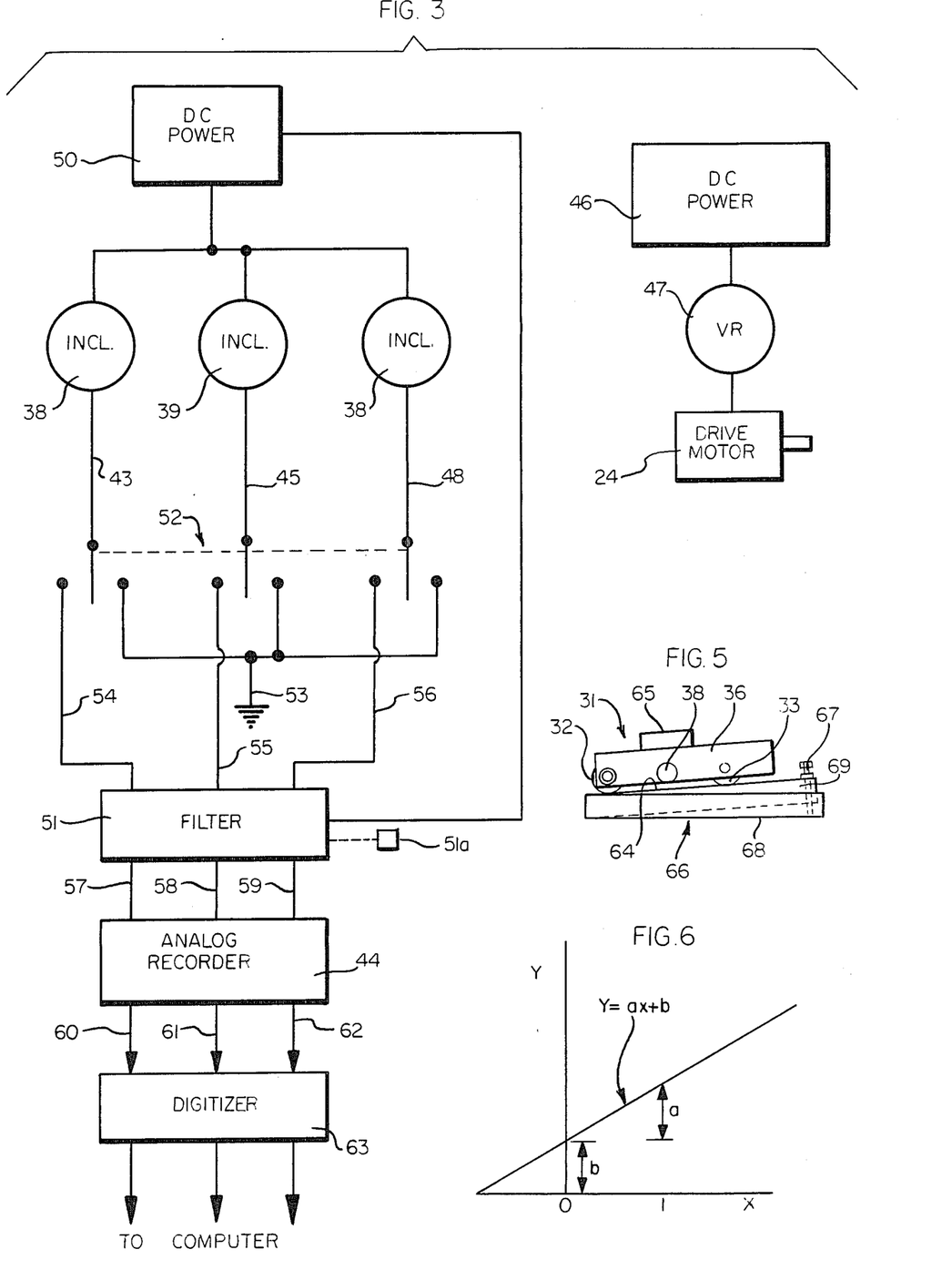
FIG. 3 is a block diagram illustrating a portion of the apparatus.
FIG. 5 (on sheet 2) is a diagrammatic illustration of calibration structure.
FIG. 6 (on sheet 2) is a graph illustrating a calibration curve employed in connection with the present invention.

Referring to FIG. 3, drive motor 24 is powered by batteries 46 delivering D.C. power to motor 24 through a voltage regulator 47 which provides a constant voltage to assure that drive motor 24 operates at a constant drive speed thereby moving apparatus 20 along the measurement path at a constant driven speed. The speed of the apparatus is determined by timing the apparatus as it runs the length of the path after the latter has bee determined and measured. The test for speed is repeated many times (e.g. ten times) at the start of each project, and the results are averaged to give an apparatus speed which is used for data purposes.

The measurement path has a predetermined length having opposite ends located as close as possible to the opposite ends of the floor, consistent with constraints to be subsequently described. The path has a pair of parallel side edges along which trailers 31, 31 travel.

As a preliminary step of the measuring procedure, inclinometers 38, 39 are calibrated employing a technique to be subsequently described, followed by the performance of other steps including running apparatus 20, with its calibrated slope sensing devices 38, 39 at a constant drive speed on floor surface 19 along the aforementioned path.

As apparatus 20 moves along the path, there is a continuous measurement of the slope on the floor surface along the path, in the longitudinal direction of the path, along each side edge thereof by inclinometers 38, 38 and transversely across the path by inclinometer 39. Each inclinometer generates a continuous voltage signal corresponding to each of the two longitudinal and one transverse continuous slope measurements. Each of these continuous voltage signals is filtered, for reasons described below, to remove extraneous high frequency voltage signals, to thereby produce continuous raw analog slope data.

The inclinometer is sensitive not only to slope and acceleration, but also to very small, extraneous surface irregularities, such as a sand particle or the like, which are not manifestations of deviations from a level surface. The voltage signals caused by the sensing of these extraneous irregularities constitute noise making it difficult to detect the true slope employing voltage signals direct from the inclinometer. However, voltage signals reflecting extraneous irregularities have a much higher frequency than voltage signals reflecting slope. Accordingly, the voltage signals generated by the inclinometer are subjected to a filtering step which filters out the extraneous high frequency voltage signals so that the resulting continuous raw analog data reflects only continuous analog slope data.

Referring now to FIG. 3, a battery 50 supplies D.C. power to inclinometers 38, 38 and 39 and to a filter 51 which removes, from the continuous voltage signals originating at the inclinometers, the extraneous high frequency voltage signals. The filtering step removes high frequency "noise" from the inclinometer, no matter the source. The unfiltered low frequency voltage signals constituting the output from filter 51 more accurately reflect the floor slope sensed by the inclinometer. As used herein the expression "extraneous high frequency" refers to frequencies which reflect very small, extraneous surface irregularities and other "noise".

The frequency level at which filtration occurs is dependent upon the speed at which the inclinometer moves along the measurement path, and this frequency level is determined empirically. For example, in a given project, surface irregulatories having a length less than 2 in. (50.8 mm) may be of no importance. For a given speed, the frequency of voltage signals reflecting a selected irregularity length can be determined. For example, at a speed of 4 in./sec. (102 mm/sec.), a voltage signal frequency of 2 hertz may correspond to an irregularity length of 2 in.(50.8 mm), and shorter irregularity lengths will be reflected by higher frequencies. Accordingly, in the given example, filter 51 can be manually adjusted with a dial (or set of dials) 51a to filter out all frequencies above 2 hertz, and this will filter out all signals reflecting irregularity lengths less than 2 in.(50.8 mm) as well as other noise above the selected frequency.

If there is a dramatic change in the speed at which trailer 31 moves, e.g. if the speed is doubled, filter 51 would require adjustment at dial 51a with respect to the frequency at which voltage signals are filtered. The adjustment would be preceded by a filtration frequency level determination of the type described in the preceding paragraph, because at the changed speed, 2 hertz would no longer reflect an irregularity length of 2 inches (50.8 mm). Provision for manual adjustments in the frequency at which filtration occurs is a common expedient in filters and is well within the skill of the art given the information set forth above.

Each of the inclinometers 38, 38, 39 is electrically connected by lines 43, 45, 48 to a gang switch at 52 which can be thrown to connect each of the inclinometers to ground at 53. The inclinometers are grounded out while the drive motor is accelerating from dead stop to a constant driving speed. This is a time during which the inclinometers would generate voltage signals reflecting acceleration. Hence the grounding out of the inclinometers during this time period. The starting point of the measuring path is selected to be sufficiently downstream of the dead stop location (e.g. several feet) to give the drive motor a chance to develop a constant driving speed.

When apparatus 20 reaches the starting point of the measurement path, gang switch 52 is thrown in an opposite direction from ground, thereby electrically connecting the inclinometers to filter 51 via lines 54, 55, 56. Filter 51 is electrically connected by lines 57, 58, 59 to analog recorder 44. Raw analog slope data is continuously generated between the beginning and the end of the predetermined flatness measurement path, and that data is recorded at analog recorder 44.

Subsequently, analog recorder 44 is electrically connected by lines 60, 61, 62 to a digitizer 63 for converting the raw analog slope data to raw digital slope data for each of the three measured slopes. Filter 51, analog recorder 44 and digitizer 63 are of conventional construction or are within the skill of the art given the information set forth above, and the details of these components do not constitute part of this invention.

Figures 4, 8:
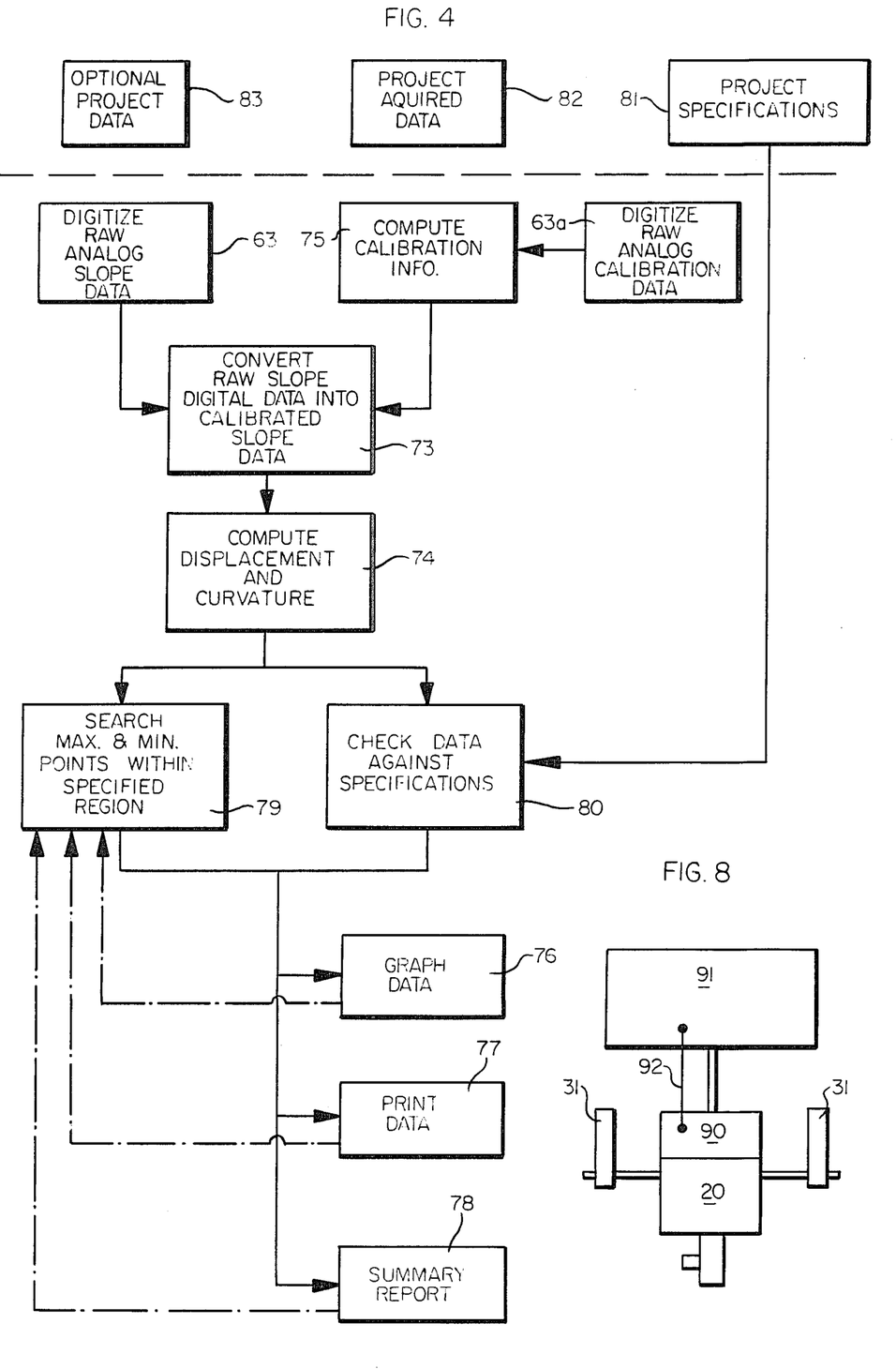
FIG. 4 is a flow diagram reflecting data processing in accordance with the present invention.
FIG. 8 is a diagrammatic illustration of another embodiment of a method and apparatus in accordance with the present invention.

Referring now to FIG. 4, the output from digitizer 63 is raw digital slope data which is fed into a computer, of conventional construction, where the raw digital slope data is converted to calibrated digital slope data (73) which in turn is used as a basis for computing displacement and curvature (74), employing conventional computing techniques.

The method steps for calibrating the slope sensing devices 38, 39 and for converting raw digital slope data into calibrated slope data will now be described, with reference to FIG. 5. Indicated generally at 66 is a calibration block comprising a base member 68 and an adjustable member 69 having a top calibration surface 64. The front and rear wheels 32, 33 of each trailer 31 are placed on calibration surface 64 which can be adjusted to a plurality of known longitudinal slope settings which can be confirmed by a digital machinist's level 65, of conventional construction and commercially available, placed atop trailer 31. The calibration block may employ a screw adjustment at 67 to obtain a desired longitudinal slope setting. Readings from the digital machinist's level are observed for each slope setting to which calibration surface 64 is adjusted, and the readings are manually recorded as known slope settings.

Transverse slope settings are obtained by raising one trailer 31 above the other, employing a pair of adjustable calibration blocks, one block under each trailer 31. The calibration block under one trailer is as shown at 66. The calibration block under the other trailer differs from block 66 in that the other block has a screw adjustment not only at 67, but also at the front end of the block for making adjustments to obtain desired transverse slope settings. The steps employed for calibrating transverse slope are similar to those described above for calibrating longitudinal slope. When calibrating transverse slope, the digital machinist's level is placed atop inclinometer 39, or thereabouts.

Typically, the calibration procedure employs three known slope settings for each inclinometer, e.g. a setting at or about 0 slope, at or about 0.03 inches per foot positive slope and at the same amount of negative slope. For a longitudinal slope measuring inclinometer 38, a positive slope is uphill in the direction of movement or uphill from right to left in FIG. 2, and a negative slope is downhill in the direction of movement or downhill from right to left in FIG. 2. For transverse inclinometer 39, a positive slope is uphill from right to left, as viewed from the front of the apparatus (to the left in FIGS. 1 and 2), and a negative slope is downhill from right to left. At each known slope setting, analog calibration data is produced by generating a continuous voltage signal from each inclinometer, for a period of time which will produce a multiplicity of digital calibration points at a pre-selected digitization interval. The digitization interval may be 1 inch or a fraction of an inch, and this will be discussed more fully below. The analog calibration data is recorded at analog recorder 44.

The calibration step should be performed at the start of every project and also each time after power to the inclinometers is turned off.

After all of the analog slope calibration data has been recorded for each of the three known slope settings, for each of the three inclinometers 38, 38, 39, the analog calibration data is digitized at the pre-selected digitization interval to produce digital calibration data (63a in FIG. 4). The same digitization interval is used for digitizing both calibration data and raw slope data.

The digital calibration data is fed into the computer which computes calibration information at 75. More particularly, the computer is programmed to derive mathematically a calibration curve (FIG. 6) by putting the observed, known slope settings along the x coordinate for this curve and plotting the corresponding digital calibration data, for each of the known settings, along the y direction for the curve. The result is a straight line calibration curve defined by the equation $y = ax + b$ wherein a and b are constants, in this case calibration constants, with the following values:

when x is 0, $y = b$
when x is 1, $y = a + b$

As noted above, a multiplicity of digital calibration points were obtained for each of the three known slope settings plotted along the x coordinate. This was accomplished during the production of analog calibration data by generating continuous voltage signals from each of the inclinometers for a relatively long period of time (e.g. many seconds). When divided by the speed at which apparatus 20 is driven (e.g. 4 in./sec.), this would correspond to a path length of many feet; and for a digitization interval of one inch, a multiplicity of digital calibration points are thus produced for each known slope setting. It is desirable to have a multiplicity of such digital calibration points when preparing the calibration curve. In this way, one may compensate for any irregularities or deviations in the voltage signals from which the digital calibration data was prepared. Such irregularities or deviations in the voltage signals would be due to "noise" in the inclinometers. A large number of data points permits these irregularities to be averaged out when plotting the calibration curve.

After the calibration curve has been derived, it is stored temporarily in the computer (or on a storage element such as a computer disk). Subsequently, the calibration curve or, more accurately, the equation defining the calibration curve, is employed mathematically to convert raw digital slope data to calibrated digital slope data wherein the values for the raw digital slope data are along the x axis for the calibration curve (i.e. x in the equation) and the values for the calibrated digital slope data are along the y axis for the curve (i.e. y in the equation) (FIG. 6). This is a conventional computer operation which the computer is programmed to perform at 73. More particularly, having derived the straight line calibration curve defined by the equation $y = ax + b$, and having determined the curve's two calibration constants, a and b, as described in the second paragraph above, for each item of raw digital slope data, x, the computer computes a corresponding item of calibrated digital slope data, y, employing the equation $y = ax + b$ wherein a and b are now both known constants (having been determined when the calibration curve was derived) and x is a known item of raw digital slope data.

As noted above, the digitization interval is introduced into the slope data at digitizer 63, and this occurs after raw analog slope data has been produced as a continuous signal. Similarly, the digitization interval is introduced into the digitizer after analog calibration data has been produced as a continuous signal (63a). The advantage of introducing the digitization interval into the data after producing analog slope data as a continuous signal is that the digitization interval can be made virtually as small as possible, limited only by the storage capacity of the computer, and the benefits of this are as follows. The number of items of digital information is inversely proportional to the size of the digitization interval. The smaller the digitization interval, the more closely the digital information reflects the continuous analog information, without there being any gaps between the items of digital information. In other words, the smaller the digitization interval, the more accurate the digital data. Therefore, selecting a digitization interval sufficiently small minimizes the distortion otherwise resulting from converting continuous analog data to digital form.

An error which must be avoided when carrying inclinometer 38 on wheeled trailer 31 is a distortion in the slope data due to phase lag. This occurs when trailer 31 first encounters a bump or depression in an otherwise flat floor. Referring to FIG. 7, as front wheel 32 on trailer 31 begins to ascend (or descend) a slope 29, inclinometer 38 immediately begins to record the slope, but the rear wheel of trailer 31 has not yet reached the slope. Consequently, the slope signal produced by the inclinometer precedes or leads the actual slope on the floor. It has been determined, in accordance with the present invention, that for corrective purposes, the slope signal's lead distance is one-half the distance between the front and rear wheel axes of trailer 31 (i.e. the wheel base of trailer 31), and this parameter does not change with a change in the location of the inclinometer on trailer 31.

Therefore, in accordance with the present invention, a correction is made for the distortion due to phase lag by (a) measuring the distance between the front and rear wheel axles of trailer 31, and then (b) shifting the location of each item of calibrated, digital slope data, in a positive (+) direction along the x-coordinate on a graph plotting amount of slope versus slope location. The extent of the shift corresponds to the above-described measured distance (i.e. one half the wheel base). For a wheel base of 2 inches, the amount of the shift would be 1 inch. Thus, if a particular slope was shown, before the correction, to be at a location 11 inches past the starting point of the measuring path, after the correction that particular slope measurement would be at 12 inches past the starting point.

As noted above, to avoid distortions in converting continuous analog data to digital data, the digitization interval is maintained relatively small. Typically, the digitization interval is less than the distance between the front and rear wheel axes of trailer 31.

In addition to slope data, it is desirable to obtain other data characterizing the flatness deviations. Such other data comprises displacement and curvature (rate of slope change). Both displacement and curvature can be computed from the slope data, and these computations are performed at 75 (FIG. 4) after converting raw slope data into calibrated slope data. Displacement is computed by numerical integration from the calibrated slope data, and curvature is computed by numerical differentiation from the calibrated slope data. The computer is programmed to perform these computations employing conventional equations which are within the skill of the art. Other, higher order derivatives may be computed, if desired.

Another correction which must be introduced arises in connection with the displacement data. When the displacement data is computed by numerical integration from digital slope data which in turn was converted from analog slope data, there occurs an amplitude translation in the displacement data for which there must be an adjustment before the correct displacement is obtained.

The correction in the displacement data involves measuring the elevation at both the beginning and the end of the measurement path (e.g. with a transit), subtracting the end elevation from the beginning elevation to produce an elevation difference, and then incorporating this elevation difference into each item of displacement data to provide corrected displacement data. If the computed elevation difference is a positive number, it is subtracted, and if it is a negative number it is added to each item of displacement data.

The resulting corrected displacement data can then be numerically differentiated to produce slope data which differ from the previously-obtained calibrated slope data only in that very slight errors are now eliminated, but this last step is optional. An additional optional step is to determine, with a transit for example, the absolute elevation and incorporate this figure into the displacement data as a constant to give absolute displacement rather than relative displacement.

Another distortion in the data can arise if there is a substantial difference between the wheel base of trailer 31 and the length of the flatness deviation (e.g. a bump) along the measurement path. When the ratio of (a) wheel base to (b) length of flatness deviation is large, the measuring device cannot accurately reproduce the true slope of the flatness deviation. To the extent that correction for this anomaly is possible, it can be accomplished by minimizing the ratio of (a) the trailer's wheel-base to (b) the length of the flatness deviations expected to be encountered, and this can be done by minimizing the trailer's wheel base (a). Because of physical constraints, it may be difficult to reduce the length of the wheel base to less than 2 inches. Typically, a wheel base in the range 2-4 inches is employed in accordance with the present invention, and this should be satisfactory for most operating conditions.

Referring to FIG. 4, after all the desired data has been computed, it is presented in graphic form, either as a tabular printout (77), or as graphs or curves (76) plotting a particular flatness deviation measurement (e.g. slope) versus location along the linear path at which measurements were conducted. A summary report (78) can also be included as part of the graphic presentation. A conventional dot matrix printer is employed to produce the graphic presentations described in this paragraph.

In addition to being graphically presented as printouts, the data can also be presented on the CRT screen of the computer.

Data printouts or data presentations on the CRT screen can also be obtained at various stages of the data processing. This can be helpful in checking for aberrations, which may be due to momentary voltage surges or the like; and these aberrations can then be edited out of the data, if desired.

Before the data is presented in graphic form, a search is made (79) to determine the maximum and minimum points within a particular specified quantitative range. These points can reflect the limits on flatness deviations contained in the project specifications, or other maximum and minimum points can be selected as desired. The data can also be checked (80) against the project specifications (81) which are manually fed into the computer.

A primary reason for the search procedure is to set limits for the graphs which are prepared, both the horizontal (x) coordinate limits and the vertical (y) coordinate limits. The specification limits can be plotted on the same graph to show graphically when a flatness deviation is inside or outside of the specifications. If, in the graph of one particular set of data (e.g. slope), there is a part of the graph which requires closer scrutiny, one may increase the vertical scale and decrease the horizontal scale, on the print-out of the graph.

The computation and data processing steps described above are performed by the computer which has been appropriately programmed to do so. Such programs are well within the skill of the art given the information set forth above.

Acquired information (82) requiring a manual input into the computer for each project includes, in addition to the project specifications (81), the digitization interval, the trailer wheel base, the length and width of the measurement path, the known slope settings obtained during the calibration operation, the phase lag dimension, the displacement correction number (elevation differential), the constant driven speed of the motor and the like. All of this manual input information is required.

Optional manually input information (83) could include the date on which the measurements were performed, the location of the project, the names of the operators, and the like.

After finally obtaining all the desired flatness deviation data, and determining whether there are any deviations which are outside the specification limits for the floor's flatness, a refinishing step may be necessary to remove, from the floor, at least some of the flatness deviations. In the course of conducting this removing step, one would employ at least some of the flatness deviation data as a guide to direct the removing step. On a concrete floor, flatness deviations in the form of bumps can be removed by abrasion. On a concrete floor which has fully set, flatness deviations in the form of recesses would be corrected by removing that particular part of the floor, dictated by the flatness deviation data, and applying fresh concrete to that spot; and the same procedure can be applied to bumps.

It is contemplated that a method in accordance with the present invention can be performed not only on fully set concrete, but also on incompletely set concrete. In the latter situation, the removing step could be performed before the concrete has fully set, and in such a case, all flatness deviations, both bumps and recesses, can be corrected or leveled out employing concrete finishing equipment. Referring to FIG. 8, in a preferred embodiment of such an operation, the concrete finishing equipment, shown diagrammatically at 91, would follow or be coupled behind measurement apparatus 20 along the measurement path and the finishing equipment would be directed by signals, from a computer 90 associated with the measuring apparatus, continuously fed to the finishing equipment along a communication cable 92.

The foregoing detailed description has been given for clearness of understanding only, and no unnecessary limitations should be understood therefrom, as modifications will be obvious to those skilled in the art.

We claim:

1. A method for measuring deviations from flatness on a horizontal surface by employing an apparatus comprising a plurality of instruments sensitive to slope, said method comprising the steps of:
   calibrating each instrument;
   running said apparatus at a constant driven speed on said surface along an elongated path having a predetermined length and a pair of parallel side edges;
   continuously measuring, with said instruments, the slope of said surface in the longitudinal direction of said path along at least one side edge thereof and transversely across said path, while said apparatus runs along said path;
   generating a continuous voltage signal for each of said longitudinal and transverse continuous slope measurements;
   filtering out, from said voltage signals, extraneous high frequency voltage signals to thereby produce continuous raw analog slope data;
   digitizing said analog slope data at a pre-selected digitization interval to thereby produce raw digital slope data;
   and converting said raw digital slope data to calibrated digital slope data.

2. A method as recited in claim 1 wherein said calibrating step comprises:
   setting said instrument on a plurality of known slopes, both longitudinal and transverse;
   and producing analog calibration data by generating a continuous voltage signal, at each of said known slope settings, for a period of time which will produce a multiplicity of digital data at said preselected digitization interval.

3. A method as recited in claim 2 and comprising:
   digitizing said analog calibration data at said digitization interval to produce digital calibration data;
   deriving a straight line calibration curve, $y=ax+b$, by putting said known slope settings along the X-axis for said curve and plotting the corresponding digital calibration data, for each of said known settings, along the y direction for said curve;
   storing said calibration curve;
   and employing said calibration curve to convert said raw digital slope data to calibrated digital slope data wherein the values for said raw digital slope data are along the X-axis for said curve and the values for said calibrated digital slope data are along the y axis for said curve.

4. A method as recited in claim 1 wherein said digitizing step comprises:
   introducing said digitization interval into said slope data after producing raw analog slope data as a continuous signal.

5. A method as recited in claim 4 and comprising:
   selecting a digitization interval sufficiently small to minimize the distortion resulting from converting said continuous analog data to digital form.

6. A method as recited in claim 1 wherein said instrument which measures said slope in the longitudinal direction of said path is mounted on a vehicle having front and rear wheels, and the slope data generated by said instrument reflects a slope location which lags the actual slope location by one-half the distance between the axes of the front and rear wheels and, said method comprising correcting for said lag by the steps of:
   measuring said distance between said front and rear wheel axes;
   and shifting the location, of each item of calibrated, digitized slope data, in a positive (+) direction along the x-coordinate on a graph plotting amount of slope versus slope location;
   the extent of said shift corresponding to one-half said measured distance.

7. A method as recited in claim 6 wherein said digitization interval is less than the distance between said front and rear wheel axes.

8. A method as recited in claim 1 and comprising:
   computing displacement data by numerical integration from said calibrated longitudinal slope data;
   measuring the elevation at both the beginning and the end of said path;
   subtracting said measured end elevation from said measured beginning elevation to produce an elevation difference;
   and incorporating said elevation difference into each item of displacement data to provide a more accurate presentation of displacement.

9. A method as recited in claim 8 and comprising:
   differentiating the displacement data resulting from the method of claim 8, to provide slope data of improved correctness.

10. A method as recited in claim 1 wherein each instrument which measures said slope in the longitudinal direction of said path is mounted on a vehicle having front and rear wheels, said method comprising:
    minimizing the ratio of (a), the distance between the front wheel axis and the rear wheel axis on said vehicle, to (b) the length of flatness deviations expected to be encountered, and doing so by minimizing said distance (a).

11. A method as recited in claim 1 and comprising:
    computing at least one of (a) displacement and (b) curvature data from said calibrated longitudinal digital slope data.

12. In combination with the method recited in claim 11, the steps of:
    smoothing out at least some of said flatness deviations in said horizontal surface;
    and employing at least one of the group comprising said calibrated slope data, said displacement data and said curvature data to direct said smoothing step.

13. In the combination of claim 12 wherein said surface is composed of incompletely set concrete and wherein:
    said smoothing step is performed before said concrete has fully set.

14. In the combination of claim 13 wherein:
    said smoothing step is performed by equipment following said apparatus along said path.

15. A method as recited in claim 1 and comprising:
    presenting said calibrated data in graphic form.

16. A method for measuring deviations from flatness on a horizontal surface by employing at least one slop sensing instrument, said method comprising the steps of:
    selecting a digitization interval;
    calibrating said slope sensing instrument by setting said instrument at a plurality of known slopes;

and producing analog calibration data by generating a continuous voltage signal, at each of said known slope settings, for a period of time which will produce a multiplicity of digital data at said selected digitization interval;

running the calibrated slope sensing instrument on said surface along an elongated path having a predetermined length and a pair of parallel side edges;

continuously measuring at least one of the surface slopes in the group of surface slopes comprising (a) the surface slope in the longitudinal direction of said path and (b) the surface slope transversely across said path, while said instrument runs along said path;

generating a continuous voltage signal for each continuous slope measurements to thereby produce continuous raw analog slope data;

digitizing said continuous analog calibration data, at said selected digitization interval, to produce digital calibration data;

deriving a straight line calibration curve, $y=ax+b$, by putting said known slope settings along the x-axis for said curve and plotting the corresponding digital calibration data, for each of said known settings, along the y direction for said curve;

storing said calibration curve;

digitizing said analog slope data at said selected digitization interval to thereby produce raw digital slope data;

and employing said stored calibration curve to convert said raw digital slope data to calibrated slope data wherein the values for said raw digital slope data are along the x-axis for said curve and the values for said calibrated digital slope data are along the y axis for said curve.

17. A method as recited in claim 16 wherein said digitizing step comprises:
introducing said digitization interval into said slope data after producing raw analog slope data as a continuous signal.

18. A method for measuring deviations from flatness on a horizontal surface, said method comprising the steps of:
running at least one calibrated slope sensing instrument on said surface along an elongated path having a predetermined length and a pair of parallel side edges;

continuously measuring, with said instrument, at least one of the surface slopes in the group of surface slopes comprising (a) the surface slope in the longitudinal direction of said path along one side edge thereof and (b) the surface slope transversely across said path, while said instrument runs along said path;

generating a continuous voltage signal for each continuous slope measurement to thereby produce continuous raw analog slope data;

digitizing said continuous analog slope data at a preselected digitization interval to thereby produce raw digital slope data;

said digitizing step comprising introducing said digitization interval into said slop data after producing raw analog slope data as a continuous signal;

selecting a digitization interval sufficiently small to minimize the distortion resulting from converting said continuous analog data to digital form;

and converting said raw digital slope data to calibrated digital slope data.

19. A method for measuring deviations from flatness on a horizontal surface, said method comprising the steps of:
running a calibrated slope sensing instrument on said surface along an elongated path having a predetermined length;

continuously measuring the slope of said surface in the longitudinal direction of said path, while said instrument runs along said path;

generating a continuous voltage signal for said longitudinal continuous slope measurements to thereby produce continuous raw analog longitudinal slope data;

digitizing said analog slope data at a pre-selected digitization interval to thereby produce raw digital longitudinal slope data;

converting said raw digital slope data to calibrated digital slope data;

said instrument which measures said slope being mounted on a vehicle having front and rear wheels, and the slope data generated by said instrument reflects a slope location which lags the actual slope location by one-half the distance between the axes of the front and rear wheels, said method comprising correcting for said lag by the steps of:

measuring said distance between said front and rear wheel axes;

and shifting the location, of each item of calibrated, digitized slope data, in a positive (+) direction along the x-coordinate on a graph plotting amount of slope versus slope location;

the extent of said shift corresponding to one-half said measured distance.

20. A method for measuring deviations from flatness on a horizontal surface, said method comprising the steps of:
running a calibrated slope sensing instrument on said surface along an elongated path having a predetermined length and a pair of parallel side edges;

continuously measuring the slope of said surface in the longitudinal direction of said path along at least one side edge thereof, while said instrument runs along said path;

generating a continuous voltage signal for each of said longitudinal continuous slope measurements to thereby produce continuous raw analog longitudinal slope data;

digitizing said analog slope data at a pre-selected digitization interval to thereby produce raw digital longitudinal slope data;

converting said raw digital slope data to calibrated digital slope data;

computing displacement data by numerical integration from said calibrated slope data;

measuring the elevation at both the beginning and the end of said path;

subtracting said end elevation from said beginning elevation to produce an elevation difference;

and incorporating said elevation difference into each item of displacement data to provide a more accurate presentation of displacement.

21. A method as recited in claim 20 and comprising:
differentiating the displacement data resulting from the method of claim 20, to provide slope data of improved correctness.

22. A method for measuring deviations from flatness on a horizontal surface, said method comprising the steps of:

running a calibrated slope sensing instrument on said surface along an elongated path having a predetermined length and a pair of parallel side edges;

continuously measuring the slope of said surface in the longitudinal direction of said path along at least one side edge thereof, while said instrument runs along said path;

generating a continuous voltage signal for each longitudinal continuous slope measurement to thereby produce continuous raw analog longitudinal slope data;

digitizing said analog slope data at a preselected digitization interval to thereby produce raw digital longitudinal slope data;

converting said raw digital slope data to calibrated digital slope data;

said instrument which measures said slope in the longitudinal direction of said path being mounted on a vehicle having front and rear wheels;

and minimizing the ratio of (a), the distance between the front wheel axis and the rear wheel axis on said vehicle, to (b) the length of flatness deviations expected to be encountered, and doing so by minimizing said distance;

said digitization interval being less than said distance (a) to avoid distortions in converting continuous analog data to digital data.

23. A method for measuring deviations from flatness on a horizontal surface by employing an instrument sensitive to slope, said method comprising the steps of:

running said instrument at a constant driven speed on said surface along an elongated path;

continuously measuring the slope of said surface while said instrument runs along said path;

generating no more than a single continuous voltage signal for said continuous slope measurement;

filtering out, from said single voltage signal, extraneous high frequency voltage signals to thereby produce continuous raw analog slope data;

digitizing said analog slope data to produce raw digital slope data;

calibrating said instrument to produce digital calibration data, before measuring said slope;

and converting said raw digital slope data to calibrated digital slope data, employing said digital calibration data.

24. Apparatus for measuring deviations from flatness on a horizontal surface, said apparatus comprising:

a plurality of slope sensing instruments;

means for moving said instruments together at a constant driven speed along an elongated path having a pair of parallel side edges;

said instruments comprising means, sensitive to slope, for continuously measuring respectively the longitudinal slope along at least one side edge of said path and the transverse slope across said path, as said instruments move along the path;

each instrument comprising means for generating a continuous voltage signal corresponding to the continuous slope measurement;

means for filtering out from said voltage signals extraneous high frequency voltage signals to thereby produce continuous raw analog slope data;

means for digitizing said analog slope data at a preselected digitization interval to thereby produce raw digital slope data;

and means for converting said raw digital slope data to calibrated digital slope data.

25. In combination with the apparatus recited in claim 24:

means for setting one of said instruments at a plurality of known longitudinal slopes;

and means for setting another of said instruments at a plurality of known transverse slopes;

said apparatus comprising means, including said voltage generating means, for producing analog calibration data by generating a continuous voltage signal, at each of said known slope settings, for a period of time which will produce a multiplicity of digital data at said pre-selected digitization interval.

26. Apparatus as recited in claim 25 wherein:

said digitizing means comprises means for digitizing said analog calibration data at said pre-selected digitization interval to produce digital calibration data;

said apparatus comprises means for deriving a straight line calibration curve, $y=ax+b$, by putting said known slope settings along the x-axis for said curve and plotting the corresponding digital calibration data, for each of said known settings, along the y direction for said curve;

means for storing said calibration curve;

and means for employing said stored calibration curve to convert said raw digital slope data to calibrated digital slope data wherein the values for said raw digital slope data are along the x-axis for said curve and the values for said calibrated digital slope data are along the y axis for said curve.

27. Apparatus as recited in claim 24 and comprising:

means for permitting the introduction of a digitization interval into said slope data after producing raw analog slope data as a continuous signal.

28. Apparatus as recited in claim 24 and comprising:

means for computing at least one set of data in the group of data comprising (a) displacement data and (b) curvature data, from said calibrated digital longitudinal slope data.

29. Apparatus as recited in claim 24 and comprising:

means for presenting said calibrated data in graphic form.

30. A combination for measuring deviations from flatness on a horizontal surface, said combination comprising:

a slope sensing instrument;

means for moving said instrument along an elongated path having a pair of parallel side edges;

said instrument comprising means for continuously measuring slope as said instrument moves along the path;

means for calibrating said slope sensing instrument by setting said instrument on a plurality of known slopes;

means for producing analog calibration data by generating a continuous voltage signal, at each of said known slope settings, for a period of time which will produce a multiplicity of digital data at a selected digitization interval;

means for digitizing said analog calibration data at said selected digitization interval to produce digital calibration data;

means for deriving a straight line calibration curve, $y=ax+b$, by putting said known slope settings along the x-axis for said curve and plotting the corresponding digital calibration data, for each of said known slope settings, along the y direction for said curve;

means for storing said calibration curve;

said voltage generating means comprising means for generating a continuous voltage signal for each of said continuous slope measurements;

said digitizing means comprising means for digitizing said analog slope data at said selected digitization interval to thereby produce raw digital slope data;

and means for employing said stored calibration curve to convert said raw digital slope data to calibrated slope data wherein the values for said raw digital slope data are along the x-axis for said curve and the values for said calibrated digital slope data are along the y axis for said curve.

31. Apparatus for measuring deviations from flatness on a horizontal surface, said apparatus comprising:

an instrument sensitive to slope;

means for running said instrument at a constant driven speed on said surface along an elongated path;

said instrument comprising means for continuously measuring the slope of said surface while said instrument runs along said path;

said instrument comprising means for generating no more than a single continuous voltage signal for said continuous slope measurement;

means for filtering out, from said single voltage signal, extraneous high frequency voltage signals to thereby produce continuous raw analog slope data;

means for digitizing said analog slope data to produce continuous raw digital slope data;

means for calibrating said instrument and for producing digital calibration data;

and means for converting said raw digital slope data to calibrated digital slope data, employing said digital calibration data.

32. A method as recited in claim 10 wherein:
said digitization interval is less than said distance (a).

33. A method as recited in claim 23 wherein said calibrating step comprises:

setting said instrument on a plurality of known slopes;

producing analog calibration data by generating a continuous voltage signal, at each of said known slope settings;

digitizing said analog calibration data to produce digital calibration data;

employing, in each of said digitizing steps, a pre-selected digitization interval;

said step of generating a continuous voltage signal at each known slope setting being conducted for a period of time which will produce a multiplicity of digital data at said pre-selected digitization interval.

34. Apparatus as recited in claim 31 wherein said calibrating means comprises:

means for setting said instrument on a plurality of known slope settings;

means for producing analog calibration data by generating a continuous voltage signal, at each of said known slope settings;

and means for digitizing said analog calibration data to produce digital calibration data.

35. A method as recited in claim 1 wherein:

said calibrating step comprises calibrating each instrument to produce digital calibration data, before said measuring step;

and said converting step comprises employing said digital calibration data.

36. In combination with the apparatus recited in claim 24:

means for calibrating said instruments;

said apparatus comprising means, including said voltage generating means and said digitizing means, for cooperating with said calibrating means to produce digital calibration data, before moving said instruments;

said converting means comprising means for employing said digital calibration data.

* * * * *